No. 643,616. Patented Feb. 20, 1900.
J. ALLAN & F. MOORE.
BACK PEDALING BRAKE.
(Application filed Nov. 29, 1898.)
(No Model.) 2 Sheets—Sheet 1.
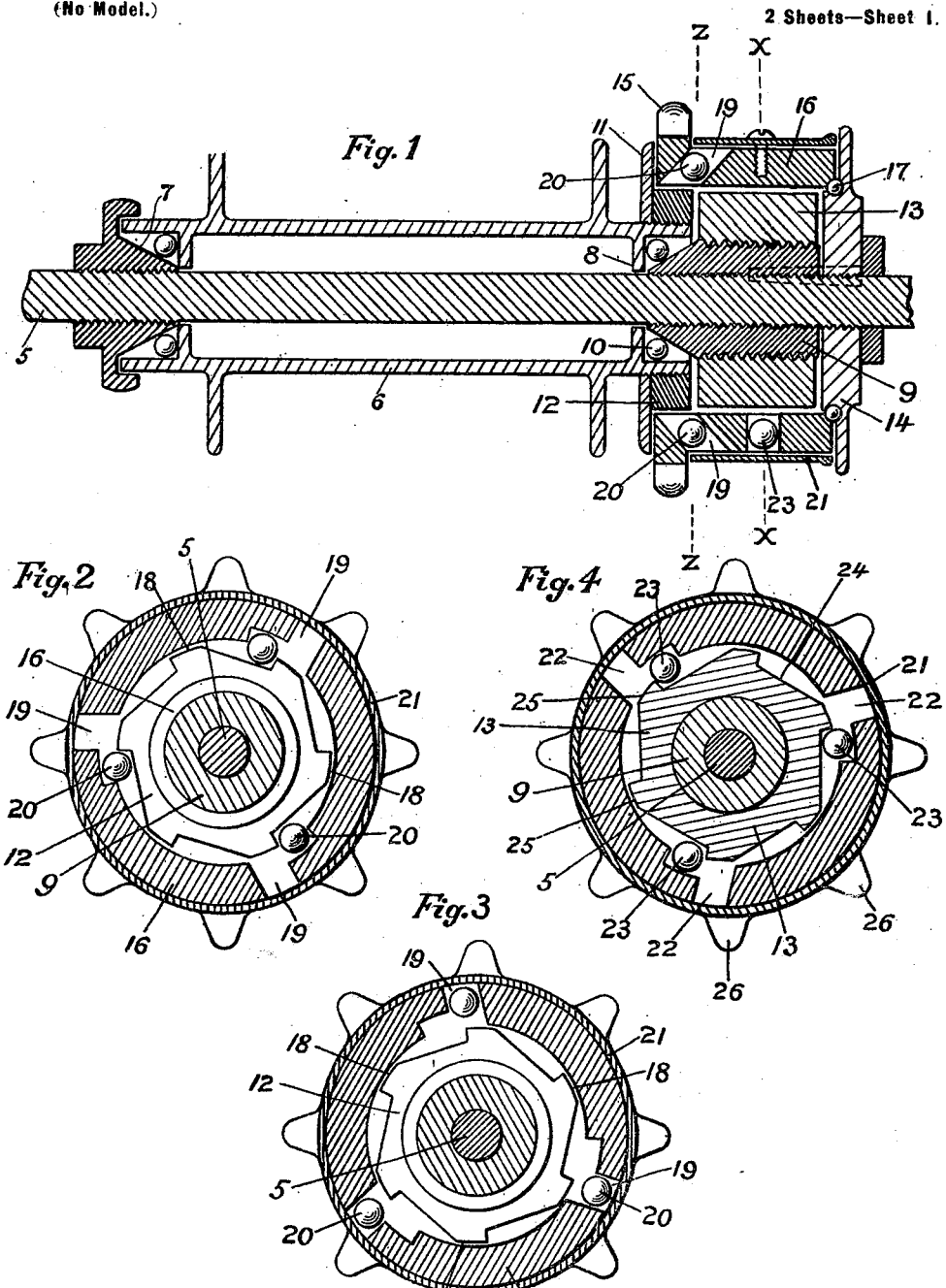
WITNESSES
INVENTORS
James Allan and
Frank Moore
BY
Edgar Tate & Co.
ATTORNEYS

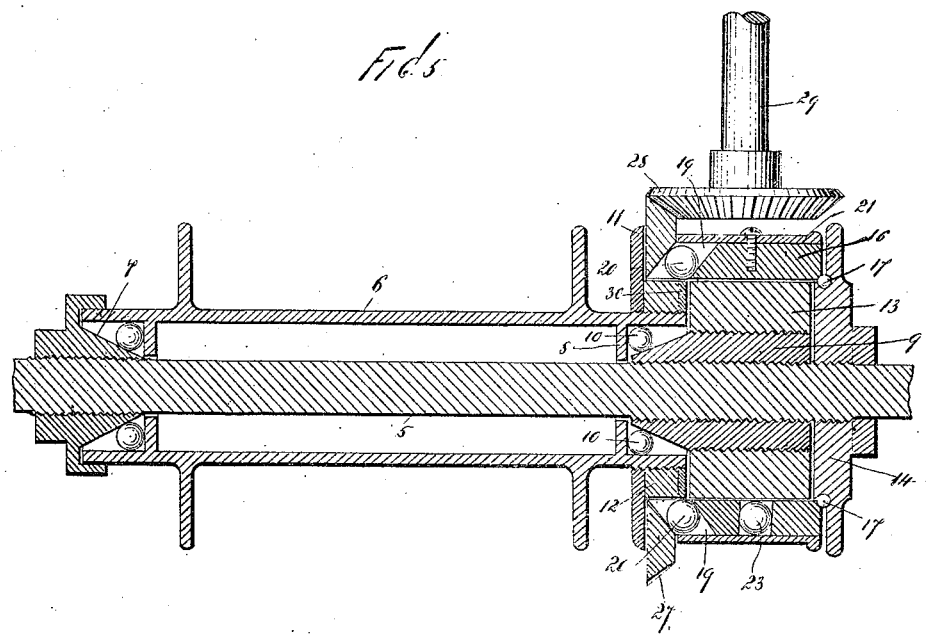

UNITED STATES PATENT OFFICE.

JAMES ALLAN AND FRANK MOORE, OF LONDON, ENGLAND.

BACK-PEDALING BRAKE.

SPECIFICATION forming part of Letters Patent No. 643,616, dated February 20, 1900.

Application filed November 29, 1898. Serial No. 697,779. (No model.)

*To all whom it may concern:*

Be it known that we, JAMES ALLAN, residing at Springwell, Barnes, London, and FRANK MOORE, residing at Barnes, London, in the county of Surrey, England, subjects of the Queen of Great Britain, have invented certain new and useful Improvements in Propelling and Brake Mechanism for Bicycles and Similar Vehicles, of which the following is a full and complete specification, such as will enable those skilled in the art to which it appertains to make and use the same.

This invention relates to bicycles and similar vehicles; and the object thereof is to provide an improved propelling and brake mechanism for vehicles of this class whereby the rider is given perfect control of the vehicle by means of the pedals. To attain this object, we mount on the hub of the drive-wheel of the vehicle a gear-wheel, which forms a part of the driving mechanism and which consists of an ordinary sprocket-wheel or a beveled gear-wheel, the mounting of said gear-wheel being such that when the pedals are at rest the drive-wheel of the vehicle can revolve freely in the forward direction, so as to travel down an incline without moving the pedals, and when the pedals are moved forward the gear-wheel will engage the hub of the driving-wheel of the vehicle and so propel the vehicle, and when the pedals are moved backward the driving-gear will be disengaged and a brake applied.

The invention is fully disclosed in the following specification, of which the accompanying drawings form a part, in which—

Figure 1 is a longitudinal sectional view of the shaft or axle of the drive-wheel of a vehicle of the class described, the propelling and brake mechanism being also shown in section and the parts thereof being unlocked; Fig. 2, a section on the line $z$ $z$ of Fig. 1, showing the parts of the driving mechanism in a locked position, as when the pedals are in operation; Fig. 3, a similar view showing the parts of the driving mechanism in an unlocked position, as when in "coasting;" Fig. 4, a section on the line $x$ $x$ of Fig. 1, showing the parts of the brake mechanism in a locked position, as when the brake is in operation; and Fig. 5, a view similar to Fig. 1, showing a modified form of construction.

In the drawings forming part of this specification the separate parts of our improvement are designated by the same numerals of reference in each of the views, and in said drawings we have shown at 5 the shaft or axle of the drive-wheel of a vehicle of the class described, it being understood that said shaft is stationary and that the drive-wheel turns thereon. We have also shown at 6 the hub of the drive-wheel of the vehicle, which is of the usual form and which turns on the shaft or axle 5. One end of the hub 6 may be connected with the shaft or axle in the usual or any preferred manner, as shown at 7, and the other end of said hub is provided with an inwardly-directed annular flange 8, and the shaft or axle adjacent to said flange is provided with a stationary brake-hub 9, the inner end of which is conical in form and forms part of the bearing for the balls 10, which constitute a ball-bearing for this end of the hub. We also preferably mount on or secure to the hub 6 a disk or plate 11, and outside of said disk or plate the end of the hub is provided with a collar 12, which is secured thereto, and said disk or plate and collar may be formed integrally, if desired.

The brake-hub 9 is screw-threaded, and mounted thereon is a screw-threaded brake-sleeve 13, which is adapted to turn on the brake-hub and to move longitudinally thereon by reason of the screw-threads with which said brake-sleeve and brake-hub are provided.

The end of the shaft or axle is also provided with a disk or plate 14, which is also adapted to be screwed onto said shaft or axle, and said disk or plate and the brake-hub 9 are preferably keyed to said shaft or axle or secured thereto in any preferred manner.

A driving-gear 15 is mounted on the collar 12 and, in the form of construction shown in Fig. 1, consists of an ordinary sprocket-wheel, and said driving-gear is provided with a hub 16 which incloses the brake-sleeve 13, and between which and the disk or plate 14 are placed ball-bearings 17, and the driving-gear, together with the hub thereof, which is formed integrally therewith, is free to revolve under certain conditions around the collar 12 and the brake-sleeve 13.

The collar 12 is provided in the perimeter thereof with backwardly-directed teeth 18, and the gear-wheel 15 is provided in its inner perimeter and in the hub 16 adjacent thereto with chambers or recesses 19, which are irregular in form and which open outwardly through the hub, and in these chambers or recesses are placed locking-balls 20, three of which are shown in Fig. 2, and said locking-balls are held in said chambers or recesses by a band 21, secured to the hub 16 of the gear 15. The hub 16 of the drive-wheel 15 is also provided centrally of the perimeter thereof with an annular row of chambers or recesses 22, which are irregular in form and similar to the chambers or recesses 19 in the inner perimeter of the gear 15 and in which are placed locking-balls 23, three of which are shown in Fig. 4, and the brake-sleeve 13 is provided with triangular cavities or recesses 24, by means of which forwardly-directed teeth 25 are formed, these teeth being similar to the teeth 18, formed on the collar 12.

Although we have described the gear 15 as consisting either of a beveled gear-wheel or sprocket-wheel, we have shown it in the form of a sprocket-wheel provided with sprocket-teeth 26, and said gear-wheel is adapted to be driven by a chain connected with a corresponding sprocket-wheel on the pedal-shaft of the vehicle.

The operation will be readily understood from the foregoing description when taken in connection with the accompanying drawings and the following statement thereof.

When the pedal-shaft is in motion, the driving-gear 15 is locked to the collar 12, and the drive-wheel of the vehicle revolves with said driving-gear, as will be readily understood, and in this operation the locking-balls 20 or one or more of them will drop down and engage the teeth 18 of the collar 12, which is secured to the hub 6, as shown in Fig. 2, and said hub, together with the drive-wheel of the vehicle, of which it forms a part, will be turned forwardly in the usual manner. If at any time the motion of the pedal-shaft and pedals should be stopped, as when in "coasting," the hub 6 and the collar 12 will continue to turn in the forward direction, the teeth 18 of said collar moving backwardly and throwing the locking-balls 20 back into the notches or recesses 19, as shown in Fig. 3.

In the operation of propelling the vehicle, as above described, it will be understood that the brake-sleeve 13 is stationary, the hub 16 of the gear 15 revolving thereon, and in this operation the locking-balls 20 are driven back into the chambers or recesses 22, as shown in Fig. 4, and do not engage with the teeth 25 of the brake-sleeve 13, and whenever it is desired to apply the brake the pedals are moved backwardly and the direction of the movement of the gear 15 is reversed, and in this operation the locking-balls 22 engage with the teeth 25 of the brake-sleeve 13, and said brake-sleeve is revolved on the brake-hub 9 and moved inwardly into contact with the collar 12 and the end of the hub 16, thus causing friction, which operates as a brake to stop the drive-wheel of the vehicle, and when the pedals are again moved forwardly the brake-sleeve 13 is turned in the opposite direction and moved outwardly on the brake-hub 9. In this operation a slight backward movement of the pedals is necessary in order to produce sufficient friction to check the vehicle, and if it is desired to stop the vehicle the pedals are moved backward farther and the sleeve 13 is caused to press against the collar 12 or the end of the hub 6 with sufficient force to stop the revolution of the wheel of which said hub forms a part. This pressure of the brake-sleeve is exerted only so long as the pedals are held in a backward position, and as soon as the pedals are again moved forwardly the brake-sleeve is released by the friction occasioned by the movement of the collar 12 or the hub 6, said parts being rigidly connected, and the brake-sleeve 13 is moved outwardly sufficiently to allow the drive-wheel to freely revolve. This outward movement is very slight, and only a partial revolution of the brake-sleeve is necessary to accomplish the same, the pitch of the threads on the inner bore of the brake-sleeve and the brake-hub 9 being regulated so as to accomplish this object, and the sprocket-wheel moving in a forward direction operates to keep the brake-sleeve away from the collar 12 and hub 6 of the drive-wheel.

The cavities or recesses 19 in the gear 15 are angular in form, as shown in Figs. 2 and 3, and the inner portions thereof are of a depth equal to one-half of the diameter of the balls 20, and the teeth 18 on the collar 12 project a similar distance, and said balls when said gear and collar are locked together are half in the gear and half in the collar and form an absolute lock and not a friction-brake, as usual in this class of devices.

In Fig. 5 we have shown a modified form of construction, in which we substitute for the sprocket-wheel 15 an ordinary beveled gear 27, which is operated upon by a corresponding beveled gear 28, mounted on a shaft 29, which in practice is geared in connection with the pedal-shaft of the vehicle, which is not shown, it being understood that this construction constitutes an ordinary chainless gear. We also preferably place adjacent to the collar 12 a washer 30, in connection with which the brake-sleeve 13 operates, and with these exceptions the construction is exactly the same as that shown in Fig. 1 and the operation similar thereto. It will also be seen that the sprocket-gear 15 and beveled gear 27 constitute ordinary driving gears or wheels for operating the drive-wheel of the vehicle, and it will be apparent that changes in and modifications of the construction described may be made without departing from the spirit of our invention or sacrificing its advantages.

Our improvement is simple in construction and operation and is perfectly adapted to accomplish the result for which it is intended and is also comparatively inexpensive.

Having fully described our invention, we claim as new and desire to secure by Letters Patent—

1. In a propelling and brake mechanism for vehicles of the class described, the combination with the shaft or axle of the drive-wheel of the vehicle, of a screw-threaded brake-hub mounted thereon, a screw-threaded brake-sleeve mounted on said hub, a collar connected with the end of the hub of the drive-wheel of the vehicle and a gear-wheel provided with a hub, said gear-wheel being mounted on said collar and the hub thereof inclosing said brake-sleeve, said gear-wheel being provided in its inner perimeter with chambers or recesses in which are placed locking-balls and said collar being provided with corresponding backwardly-directed teeth, the brake-sleeve being also provided with cavities or recesses forming forwardly-directed teeth and the hub of the gear-wheel being provided with corresponding chambers or recesses in which locking-balls are placed, and a band mounted on the hub of the drive-wheel for retaining said balls in place, substantially as shown and described.

2. The combination with the shaft or axle of the drive-wheel of a bicycle or similar vehicle, of a screw-threaded brake-hub mounted on one end thereof, a screw-threaded brake-sleeve mounted on said hub, a collar secured to the hub of the drive-wheel adjacent to said sleeve, a driving-gear mounted on said collar and provided with a hub which incloses said sleeve, means for locking said gear and said collar together when said gear is turned in the forward direction, and means for locking the hub of the driving-gear to the brake-sleeve when said gear is turned in the backward direction, substantially as shown and described.

In testimony that we claim the foregoing as our invention we have signed our names, in the presence of the subscribing witnesses, this 17th day of November, 1898.

JAMES ALLAN.
FRANK MOORE.

Witnesses:
  JAMES ADAMS,
  E. E. ADAMS.